United States Patent [19]

Meuschke et al.

[11] Patent Number: 4,650,634

[45] Date of Patent: Mar. 17, 1987

[54] QUICK RELEASE CUSHIONED T.V. CAMERA MOUNT

[75] Inventors: Robert E. Meuschke, Penn Hills Township, Allegheny County; Leonard P. Hornak, North Huntingdon; James R. Marshall, Penn Hills Township, Allegheny County, all of Pa.

[73] Assignee: Westinghouse Electric Corp., Pittsburgh, Pa.

[21] Appl. No.: 553,599

[22] Filed: Nov. 21, 1983

[51] Int. Cl.[4] .................. G21C 17/08; H04N 7/18
[52] U.S. Cl. ........................... 376/248; 358/100; 358/229
[58] Field of Search .............. 358/99, 100, 229; 376/248, 268, 271

[56] References Cited

U.S. PATENT DOCUMENTS

| | | | |
|---|---|---|---|
| 2,981,073 | 4/1961 | Robinson, Jr. | 358/99 |
| 3,066,969 | 12/1962 | Camac | 358/100 |
| 3,077,361 | 2/1963 | Tait et al. | 358/100 |
| 3,114,798 | 12/1963 | Jackson | 358/100 |
| 3,114,799 | 12/1963 | Waters et al. | 358/100 |
| 3,145,636 | 8/1964 | Hall et al. | 358/100 |
| 3,737,372 | 6/1973 | Debergh et al. | 376/248 |
| 3,761,623 | 9/1973 | Hara et al. | 358/100 |
| 4,051,525 | 9/1977 | Kelly | 358/100 |
| 4,190,857 | 2/1980 | Creek et al. | 358/100 |
| 4,277,804 | 7/1981 | Robison | 358/229 |
| 4,311,557 | 1/1982 | Kowalski et al. | 376/271 |
| 4,424,531 | 1/1984 | Elter et al. | 358/100 |
| 4,504,857 | 3/1985 | Miller et al. | 358/99 |

FOREIGN PATENT DOCUMENTS

| | | | |
|---|---|---|---|
| 1058851 | 2/1967 | United Kingdom | 376/268 |
| 1097918 | 1/1968 | United Kingdom | 376/248 |

Primary Examiner—Deborah L. Kyle
Assistant Examiner—Richard L. Klein
Attorney, Agent, or Firm—Daniel C. Abeles

[57] ABSTRACT

A refueling machine within a nuclear reactor facility includes an inner mast or gripper tube (12) to the bottom of which is secured a gripper assembly (16). An actuator tube (20) controls the gripper mechanisms of the gripper assembly (16), and in order to insure proper and accurate alignment of the gripper mechanisms with the fuel assembly nozzles, a television camera (26) is mounted within the actuator tube (20). A television monitor (34) is operatively connected to the television camera (26), the monitor (34) being disposed upon the refueling machine personnel trolley. The television camera (26) is removably mounted within the actuator tube (20) by a bayonet-type system which includes camera housing lugs (78) which are adapted to pass through slots (76), subsequent to which the camera housing (28) and the lugs (78) are rotated 90° whereby the lugs (78) are seated within recesses (80). The mounting system further includes shock absorbing spring systems (52, 62) for isolating the camera (26) for vertically upwardly and vertically downwardly directed shock loads.

2 Claims, 3 Drawing Figures

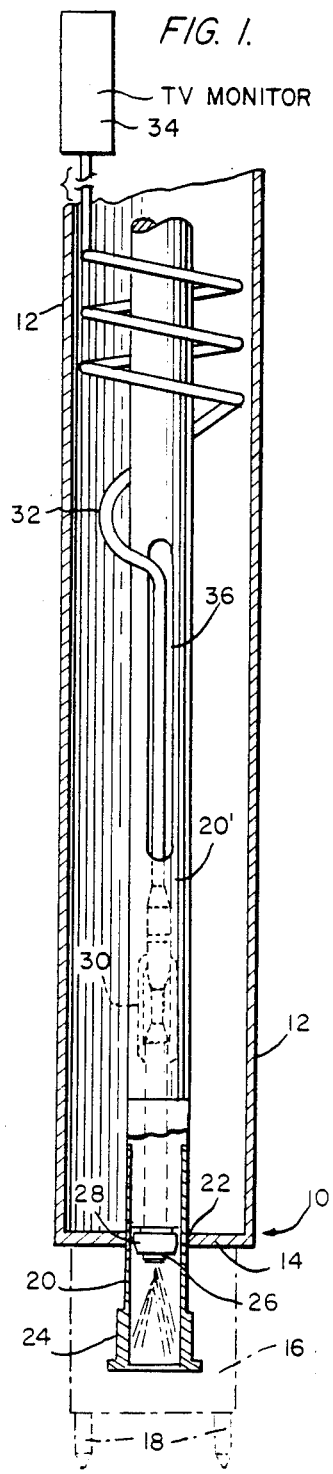
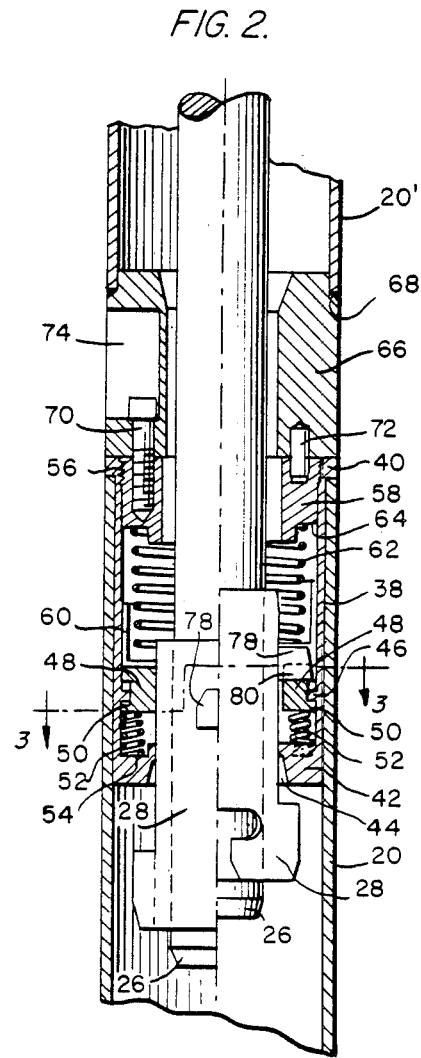
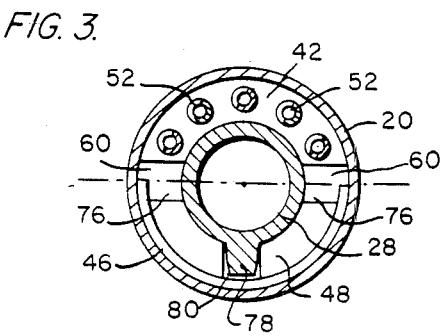
FIG. 1.
FIG. 2.
FIG. 3.

QUICK RELEASE CUSHIONED T.V. CAMERA MOUNT

TECHNICAL FIELD

The present invention relates generally to nuclear reactor facilities, and more particularly to a mounting system for a television camera which enables the latter to be mounted internally within the refueling machine gripper tube or inner movable mast so as to be movable therewith, thereby facilitating the guidance of the refueling machine gripper assembly relative to the fuel assemblies of the reactor core for achieving accurate alignment of the gripper assembly with respect to a particular fuel assembly in preparation for, and achievement of, latching of the gripper assembly with the particularly selected fuel assembly nozzle, whereby the particular fuel assembly may be lifted out of the reactor core and replaced with a new or fresh fuel assembly by means of the refueling machine.

BACKGROUND ART

As is well known in the nuclear reactor art, the reactor core fuel assemblies need to be periodically replaced in view of the fact that the nuclear fuel within the fuel assemblies becomes depleted as a result of the normal operation of the reactor facility. In accordance with conventional techniques or modes of operation, spent fuel assemblies are removed from the reactor core and replaced with new or fresh fuel assemblies by means of a refueling machine. The refueling machine conventionally comprises a trolley movable within a horizontal plane along a suitable track system disposed above the reactor core at an elevational height of, for example, thirty-five feet, and a vertically disposed outer or stationary mast is fixedly mounted upon the refueling machine trolley so as to be movable therewith. A vertically movable inner mast or gripper tube is co-axially disposed interiorly of the outer stationary mast, and a gripper assembly is fixedly secured to the lower end of the refueling machine gripper tube or inner mast. Guide pins are, in turn, fixedly secured to the lower end of the gripper assembly and are adapted to mate with suitable, correspondingly located apertures provided within the upper surface of each fuel assembly. Suitable gripper mechanisms or fingers are provided within the refueling machine gripper assembly for latchably mating with corresponding or cooperating structure of the fuel assembly nozzles, the gripper assembly guide pins serving to accurately align the gripper assembly with respect to the fuel assembly such that the gripper fingers may in fact latchably engage the fuel assembly nozzle structures. The latchable gripper mechanisms or fingers of the gripper assembly are movable between their latched and unlatched positions by means of an actuator mechanism disposed upon the lower end of a vertically movable, actuator tube co-axially disposed within the refueling machine gripper tube or inner mast.

In order to achieve the aforenoted alignment of the gripper assembly relative to the particular fuel assembly to be replaced so as to in fact achieve the aforenoted latching of the gripper mechanisms or fingers with the fuel assembly nozzle structure, it is imperative that the operator have a clear and unobstructed view of the fuel assembly nozzle. This, however, has proven to be a considerably difficult task to achieve when operating conventional refueling machines in view of the fact that the operator observes the fuel assembly nozzle structure through a suitable viewing aperture or window defined within the refueling machine trolley deck. Consequently it is readily appreciated that not only is the operator located a considerable distance away from the fuel assembly nozzle structure, but in addition, the reactor core cavity is entirely immersed within water. Therefore, light refraction causes distortion and an apparent erroneous location of the fuel assembly nozzles.

Still further, in order to view the fuel assembly nozzles, the operator must attempt the viewing operation from a position other than that which would be co-axial with the fuel assembly nozzles. Consequently, such an angularly offset location of the operator's viewpoint increases the aforenoted distortion, and therefore compounds the difficulty in accurately viewing the fuel assembly nozzle structures and obtaining the desired alignment of the gripper mechanism fingers therewith. In an attempt to resolve this problem, it has been proposed to employ television cameras mounted upon the outer stationary mast of the refueling machine. This technique, however, has likewise proven to be unsatisfactory in view of the fact that the fuel assemblies are nevertheless being viewed from a vantage point which is inclined or angularly oriented relative to a vertical axial plane of the fuel assemblies.

Accordingly, it is an object of the present invention to provide a new and improved nuclear reactor refueling machine.

Another object of the present invention is to provide a new and improved nuclear reactor refueling machine which will overcome all of the aforenoted disadvantages of the conventional nuclear reactor refueling machines and the refueling operations characteristic thereof.

Still another object of the present invention is to provide a new and improved nuclear reactor refueling machine which will greatly facilitate the alignment of the gripper assembly with the particular fuel assembly to be removed from the reactor core and replaced with a fresh or new fuel assembly so as to enhance the ease and efficiency of the nuclear reactor facility refueling process.

Yet another object of the present invention is to provide a new and improved nuclear reactor refueling machine which will provide the refueling machine operator or personnel with a clear and unobstructed view of the fuel assemblies of the reactor core so that the gripper assembly of the refueling machine, and its gripper mechanisms or fingers, can be rapidly, easily, and accurately aligned with or positioned relative to the particular fuel assemblies which are to be removed from the reactor core and replaced with fresh or new fuel assemblies.

Still yet another object of the present invention is to provide a new and improved nuclear reactor refueling machine which will permit the refueling machine operator or personnel, who is positioned at a location within the reactor facility which is remote from the reactor core and its fuel assemblies, to view the particular fuel assemblies which are to be removed from the reactor core and replaced with fresh or new fuel assemblies from a vantage point which is effectively within the immediate vicinity of the reactor core and the associated fuel assemblies.

Yet still another object of the present invention is to provide a new and improved nuclear reactor refueling machine which will permit the refueling machine operator or personnel, who is positioned at a location within the reactor facility which is remote from the reactor core and its fuel assemblies, to view the particular fuel assemblies which are to be removed from the reactor core and replaced with fresh or new fuel assemblies from a vantage point which is directly above the particular fuel assembly which is to be removed from the reactor core and replaced with a fresh, new, or different fuel assembly such that the refueling machine operator's view of the particular fuel assembly is not angularly offset or oriented relative to the particular fuel assembly, or distorted by means of the light refraction properties of the water disposed within the reactor core cavity.

DISCLOSURE OF THE INVENTION

The foregoing and other objectives of the present invention are achieved through the provision of a nuclear reactor refueling machine wherein a television camera is mounted within the refueling machine gripper tube or inner mast which is telescopically movable in a co-axial mode relative to the outer or stationary mast of the refueling machine. In particular, the television camera is mounted within the refueling machine actuator tube which is, in turn, telescopically movable in a co-axial mode relative to the gripper tube or inner mast of the refueling machine. Video signals from the television camera are of course able to be transmitted by means of suitable cables, housed or accommodated within the actuator tube, as well as within the gripper tube or inner mast, of the refueling machine, to a remote television monitor located upon the refueling machine trolley for viewing or monitoring by means of the refueling machine operator or personnel. In this manner, and particularly in view of the fact that the refueling machine outer or stationary mast, the refueling machine inner mast or gripper tube, the refueling machine actuator tube, the refueling machine gripper assembly, and the television camera are all co-axially aligned with respect to each other, the refueling machine operator or personnel is able to view the particular fuel assembly, which is to be removed from the reactor core and replaced with a new or different fuel assembly, from a vantage point which is co-axially aligned with the particular fuel assembly to be so removed and replaced. In view of the additional fact that the lower end of the actuator tube, the lower end of the gripper tube or inner mast, and the television camera will be immersed within the water disposed within the reactor core cavity, all possible sources of visual distortion, misalignment, and location error of the particular fuel assembly relative to the refueling machine gripper assembly, will have been eliminated or at least substantially reduced. The alignment process to be defined between the refueling machine gripper assembly and the particular fuel assembly to be removed from the core and replaced with a new or different fuel assembly is thus appreciated to be capable of being performed with an enhanced degree of efficiency in view of the foregoing as well as the fact that the refueling machine operator or personnel has been effectively provided with a viewing or vantage point immediately within the vicinity of the particular fuel assembly to be removed and replaced.

The television camera is secured within the refueling machine actuator tube by means of a bayonet type mounting system, and in this manner, the camera may be removed from, and inserted into, the actuator tube in a simplified manner should maintenance, repair, or replacement of the same prove necessary. Suitable decoupling means are of course preferably provided in conjunction with the electrical connector hardware which serves to connect the camera with its power and signal cables so as to permit disconnection of the same when, for example, the camera is being serviced or replaced. The mounting system for the television camera within the actuator tube assembly is further provided with suitable shock absorbing means whereby the camera will be isolated from any shock loads which may be encountered during a fuel assembly refueling operation.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a vertical cross-sectional view of the new and improved nuclear reactor refueling machine of the present invention showing the cooperative parts thereof including the refueling machine gripper tube or inner mast, the refueling machine actuator tube and the gripper assembly, and the mounting of the television camera within the refueling machine actuator tube;

FIG. 2 is an enlarged, cross-sectional, detailed view of the camera mounting system of FIG. 1 as seen to be enclosed within the ovoid-configured chain line region of FIG. 1; and FIG. 3 is a cross-sectional view of the television camera mounting system of FIG. 2 as taken along the line 3—3 of FIG. 2.

BEST MODE FOR CARRYING OUT THE INVENTION

Referring now to the drawings, and more particularly to FIG. 1 thereof, there is shown the new and improved nuclear reactor refueling machine of the present invention as generally designated by the reference character 10. The refueling machine is seen to include, in part, a vertically disposed gripper tube or inner mast 12 which is vertically movable in a telescopic manner within and relative to an outer stationary mast, not shown, of the refueling machine, the inner and outer masts of the refueling machine being co-axially disposed with respect to each other. The bottom or lower end of the inner mast or gripper tube 12 is closed by means of a centrally-apertured end wall 14, and an annular, hollow gripper assembly, shown schematically and in chain or phantom lines at 16, is suitably secured to the bottom end wall 14 of gripper tube or inner mast 12 by fastening means, such as, for example, bolt mechanisms, not shown. As is well known in the art, the gripper assembly 16 comprises a plurality of gripper finger mechanisms, not shown, for lockingly engaging the top nozzle portions of the fuel assemblies when the refueling machine is sought to engage particular fuel assemblies in performance of a refueling operation. The lower end or bottom surface of gripper assembly 16 is provided with a plurality of downwardly extending guide pins 18 for mating with an equal number of guide pin bores, not shown, defined within the upper surface of each fuel assembly nozzle. In this manner, the gripper assembly 16 is assured to be properly aligned with respect to the fuel assembly so as to, in turn, facilitate the proper alignment of the gripper assembly gripper mechanisms or fingers with respect to the corresponding latch mechanisms provided upon the fuel assembly. In order to actuate or control the operation of the gripper assembly gripper mechanisms or fingers, not shown, the refueling machine is further provided with a vertically disposed actuator tube 20 which is co-axially disposed within the refueling machine gripper tube or inner mast 12. The actuator tube 20 is vertically movable with respect to the gripper tube or inner mast 12, and the lower end of the actuator tube 20 is seen to project downwardly through an aperture 22 defined within lower end wall 14 of gripper tube 12 so as to extend into the gripper assembly 16. In this manner, a flanged tube or pipe fitting 24 fixedly secured upon the lower end of actuator tube 20 may in fact serve to actuate the gripper mechanisms or fingers, not shown, of the gripper assembly 16 in order to engage or disengage the corresponding or mating fuel assembly nozzle latching components, also not shown, during a refueling operation.

As has been noted hereinabove, refueling machine operators or personnel are disposed upon a refueling machine trolley during a core refueling operation, wherein the trolley is movable along a track system which is located at an elevational height of, for example, thirty-five feet above the reactor core. It can therefore be readily appreciated that the refueling machine operators or personnel must conventionally control the lateral or transverse movement of the refueling machine along the elevated track system, as well as the vertical movement of the gripper tube or inner mast and that of the actuator tube for actuating the gripper mechanisms or fingers, all relative to the particular fuel assembly nozzle and latching structure, from a visual viewpoint which is quite remote from the fuel assemblies. In addition, the reactor core is of course immersed within water, and therefore visual distortion, as a result of the different refractive properties of water and air corresponding to the reactor core environment and the reactor environment disposed above the core cavity, respectively, will compound the difficulties attendant the visual alignment process sought to be achieved by the refueling machine operator or personnel when, for example, the refueling machine gripper mechanisms or fingers are to engage the fuel assembly nozzle structure. A need therefore exists for a system which will in fact provide the refueling machine operators or personnel with a visual viewpoint which is effectively within the immediate vicinity of the core fuel assemblies.

The foregoing need has in fact been satisfied by means of the present invention, and in accordance with the present invention, there is provided a television camera 26 which is mounted within the gripper tube or inner mast 12 of the refueling machine. More particularly, as best seen in FIGS. 1 and 2, the television camera 26 is actually co-axially mounted within the actuator tube 20 of the refueling machine so as to be vertically movable therewith. The camera 26 is fixedly secured within a housing 28 which extends vertically upwardly within actuator tube 20 such that the upper end of housing 28 is disconnectably coupled with the lower end of a suitable electrical connector 30. The upper end of connector 30 is, in turn, electrically connected to a power/video-signal cable 32 whereby electrical power is able to be conducted to the television camera 26 while video signals are able to be transmitted from camera 26 to a television monitor 34 which is connected to the end of cable 32 which is opposite that end connected to connector 30. Connector 30 is housed internally within the actuator tube 20, however, an upper central sidewall portion of actuator tube 20 is provided with an elongated, ovoid-configured slot 36 through which power/videosignal cable 32 passes. In this manner, cable 32 is not confined within actuator tube 20 and may be conveniently coiled externally about the upper region of actuator tube 20 for routing vertically upwardly within gripper tube or inner mast 12 for ultimate connection with television monitor 34. Monitor 34 is of course disposed upon the refueling machine trolley for viewing by means of the refueling machine operators or personnel during performance of a refueling operation.

In view of the fact that the television camera is co-axially disposed within, or with respect to, the entire refueling machine comprising the outer stationary mast, not shown, the inner mast or gripper tube 12, and the actuator tube 20, it will readily be appreciated that the refueling machine operators or personnel performing the refueling operation will in fact be able to view the fuel assembly nozzles from a visual vantage point which is directly co-axially aligned therewith. Consequently, no visual distortion or correction must be compensated for or made, respectively, due to any angular offset or disorientation effects, by means of the refueling machine operators or personnel as was characteristic of conventional refueling machines and operations. In addition, it is also noted that in view of the fact that the camera 26 is mounted within the lower part of the actuator tube 20 so as to be within the vicinity of the lower end wall 14 of the gripper tube or inner mast 12, or within the vicinity of the upper portion of the gripper assembly 16, all as best seen from FIG. 1, the refueling machine operators or personnel are provided with a visual viewpoint which is effectively within the immediate vicinity of the core fuel assemblies despite the fact that the operators or personnel are physically located at a location remote from the reactor core.

Still further, as is well known in the art, the lower end of the gripper tube or inner mast 12, as well as the lower end of the actuator tube 20 and the gripper assembly 16, will be immersed within water disposed within the reactor core cavity during the refueling operation. In view of the fact, therefore, that the camera 26 will likewise be immersed within the core cavity water pool or reservoir, the video images seen and transmitted by the camera 26 to the personnel monitor 34 will not be adversely affected by the light diffraction properties of the water pool relative to those of the ambient air environment within the upper portion of the facility, that is, within the vicinity of the refueling machine trolley. It is to be noted that lighting for the camera 26 may either be self-contained within the housing assembly 28, actuator tube 20, gripper tube or inner mast 12, or gripper assembly 16, or still further, lighting means separate from those normally employed within the reactor core cavity may not be required if in fact such normal lighting present within the core cavity is sufficient to illuminate the fuel assembly nozzles so as to facilitate the engagement of the same with the gripper assembly 16 of the refueling machine as aided by the television monitoring system of the present invention. It is lastly to be noted that as depicted in FIG. 1, the actuator tube 20 is disposed in its vertically downward mode whereby the gripping mechanisms or fingers, not shown, of the gripper assembly 16 have been caused to be moved to their open positions prior to engagement with the corresponding or mating latching mechanisms of the fuel assembly nozzles, also not shown. Consequently, the view seen by the camera 26, which will of course be transmitted to the refueling machine operator or personnel by means of television monitor 34, is entirely clear and unobstructed. It is similarly to be noted that depending upon the relative axial disposition of the camera 26 relative to the actuator tube 20, and more particularly, for example, relative to actuator fitting 24, it may be possible for the camera 26, and therefore the operator or personnel by means of monitor 34, to be able to see the gripper assembly guide pins 18 in addition to being already capable of viewing the fuel assembly nozzle structures. Viewing of the guide pins 18, however, is not at all critical to the alignment operation between the gripping assembly and the fuel assembly nozzle, although such would be preferred so as to enhance the efficiency and ease of the operation still further.

Continuing further, and with particular reference now being made to FIGS. 2 and 3, another unique feature of the present invention will become apparent. It has been noted hereinabove that the camera 26 was electrically and mechanically disconnectable from its power source and video transmission cable 32 by means of electrical connector 30, however, in addition to such provision of a decoupling means, it is also desirable to be able to simply and rapidly remove the camera and its housing from the actuator tube 20 should the camera require maintenance, repair, replacement, or other similar servicing. In accordance with the particular camera mounting system of the present invention, a tubular support housing 38 is fixedly secured to the interior wall surface of actuator tube 20 by suitable means, such as, for example, welding. The upper end of the tubular support housing 38 is provided with a radially outwardly extending annular flange 40 which serves to seat the support housing 38 atop the upper end of actuator tube 20, while the lower end of the housing 38 is provided with a radially inwardly extending annular flange 42. Flange 42 defines a central aperture 44 through which camera housing 28 passes. Support housing 38 is also provided with a second radially inwardly projecting annular flange 46 which is axially disposed above the first flange 42, and it is seen that the radial extent of flange 46 is substantially less than that of flange 42. A pair of semi-circular support rings or blocks 48 are disposed upon opposite lateral sides of the camera housing 28 and include radially outwardly extending flanged portions 50 at the lower ends thereof. Circumferentially spaced coil springs 52 are interposed between the support rings or blocks 48 and support housing flange 42, the latter being provided with recessed pockets or seats 54 within which the lower ends of springs 52 are disposed. In this manner, each of the support rings or blocks 48 is biased upwardly such that contact is established between support housing flange 46 and support rings flanges 50.

The upper end of support housing 38 is internally threaded as at 56, and an annular plug 58 is threadedly secured within housing 38 at the upper end thereof. A U-shaped hold-down cup 60 is disposed atop the support rings or blocks 48, and a coil spring 62 is interposed between hold-down cup 60 and upper end plug 58, spring 62 annularly surrounding the camera housing 28. The lower end of spring 62 is confined within cup 60 while the upper end of spring 62 is seated upon an axially recessed, annular shoulder portion 64 of plug 58. In this manner, hold-down cup 60 is normally biased axially downwardly into contact with the upper surfaces of support rings or blocks 48. In order to complete the actuator tube assembly, a spacer 66 is interposed between the lower section 20 of the actuator tube and an upper section 20' of the acuator tube. Spacer 66 is welded to upper tube section 20' as at 68 and is secured to the end plug 58 by means of suitable bolt fasteners 70 circumferentially spaced about the actuator tube assembly. Dowel pins 72 are also circumferentially spaced about the actuator tube assembly in an alternating fashion along with fasteners 70, the pins 72 serving to maintain spacer 66 and plug 58 aligned so that fasteners 70 may be secured within plug 58. Windows 74 are provided within spacer 66 so as to provide access to fasteners 70.

In view of the fact that the support rings or blocks 48 are semi-circular in configuration, and further in view of the additional fact that their arcuate extent is less than 180° as compared to the internal circumference of actuator tube 20, a pair of diametrically opposed, radially extending slots 76 are defined between the support blocks 48. Camera housing 28 is correspondingly provided with a pair of diametrically opposed, radially outwardly extending lugs 78. Consequently, when it is desired to insert the camera housing 28 within the actuator tube 20, lugs 78 are aligned with slots 76 and the camera housing 28 is pushed upwardly from its position shown in the left half side of FIG. 2. The lugs 78 will engage the underside of hold-down cup 60 thereby forcing the same upwardly against the biasing force of coil spring 62. When the camera assembly has been pushed axially upwardly a sufficient extent so that the lugs 78 will clear support rings or blocks 48, the camera housing 28 is rotated 90° whereby the lugs 78 will now be disposed within recesses 80 defined within the upper portions of support blocks 48 at circumferential positions located 90° away from the slots 76 defined between the blocks 48. In this manner, not only is the camera housing 28 mounted within the actuator tube 20 by means of a bayonet-type system, but in addition, the housing 28 is lockingly secured within the actuator tube assembly by means of the lugs 78 being disposed within the recessed portions 80 of the support rings or blocks 48. To remove the camera housing 28 from the actuator tube assembly, the reverse processing is simply performed whereby the housing 28 is initially moved axially upwardly against the biasing force of coil spring 62 such that the lugs 78 clear the upper extent of support rings or blocks 48 so as to in fact permit removal of the lugs from recessed portions 80, the housing 28 is then rotated 90° to again align the lugs 78 with the slots 76 defined between the support rings or blocks 48, and finally, the housing 28 may be retracted axially downwardly. The fully inserted, locked position of the camera housing 28 within the actuator tube assembly is of course shown in the right-half side of FIG. 2.

In accordance with the unique mounting system of the present invention for the camera housing 28, it is to be appreciated that the system provides shock absorption features for the camera housing against shock loads which may be encountered during a refueling operation. In particular, once the camera housing 28 is mounted within the actuator tube assembly, the lugs 78 of housing 28 are interposed between hold-down cup 60 and support rings or blocks 48. In this manner, due to the downwardly exerted biasing force of spring 62 acting through hold-down cup 60, as well as the upwardly exerted biasing force of springs 52 acting through support blocks 48, should camera housing 28 encounter any upwardly directed shock loads, the resilient mounting defined by hold-down cup 60 and spring 62 will accommodate and dissipate the same, and similarly, should camera housing 28 experience any downwardly directed shock loads, the resilient mounting defined by means of support rings or blocks 48 and springs 52 will likewise accommodate and dissipate the same.

Thus, it may be seen that the present invention provides a new and improved refueling machine wherein a television camera is mounted within the actuator tube assembly of the machine inner mast in order to provide the refueling machine operator or personnel with an image, from the immediate vicinity of the reactor core, of the fuel assembly nozzle structure so as to insure the simple and accurate alignment of the refueling machine gripper assembly with the nozzle structure, thereby enhancing the simplicity and effiency of the refueling operation. Visual disorientation and distortion effects are eliminated, and the mounting system for the television camera within the actuator tube assembly of the refueling machine permits easy and rapid insertion and withdrawal of the same relative to the actuator tube assembly in connection with maintenance, repair, or replacement servicing. The mounting system also serves to protect the camera from shock loads which may be encountered during a refueling operation.

Obivously, many modifications and variations of the present invention are possible in light of the above teachings. It is therefore to be understood that within the scope of the appended claims, the present invention may be practiced otherwise than as specifically described herein.

We claim:

1. A mounting system for a television camera for use with a refueling machine having a gripper assembly, to facilitate the guidance of the gripper assembly relative to fuel assemblies of a nuclear reactor core comprising:
   a vertically movable mast;
   gripper means mounted on said movable mast;
   actuator means disposed within said mast for actuating said gripper means;
   a television camera, disposed in a housing, coaxially mounted within said mast by means of a shock absorbing system, whereby said television camera is isolated from both vertically upwardly and vertically downwardly directed shock loads;
   said shock absorbing system having first spring-biased means normally biased vertically downwardly, and second spring-biased means normally biased vertically upwardly, with said television camera interposed between said first and second spring-biased means; and
   a pair of semi-circular support rings disposed around said housing between said first and second spring-biased means, said support rings having an arcuate extent less than 180° and defining diametrically-opposed, radially extending slots therebetween, said camera housing having a pair of diametrically-opposed, outwardly extending lugs thereon and each of said semi-circular support rings having a recess on the upper portion thereof, whereby said lugs can be aligned with said slots, permitting upward axial movement of said camera housing, so that said lugs can clear said support rings, and said camera housing can be rotated to dispose said lugs within said recesses and lock said camera housing in place.

2. The mounting system of claim 1 wherein each of said recesses is located at a circumferential position at about 90° from said slots so that said camera housing can be rotated about 90° to dispose said lugs within said recesses in the support rings.

* * * * *